May 5, 1964  H. E. BROOKS, JR  3,132,319
TRANSDUCER ARRANGEMENT
Filed Aug. 30, 1963

INVENTOR.
HARRY E. BROOKS, JR.
BY
Douglas R. McKechnie
ATTORNEY 3,132,319
TRANSDUCER ARRANGEMENT
Harry E. Brooks, Jr., Phoenixville, Pa., assignor to The Budd Company, Philadelphia, Pa., a corporation of Pennsylvania
Filed Aug. 30, 1963, Ser. No. 305,688
3 Claims. (Cl. 338—6)

This invention relates to a transducer arrangement wherein a transducer is inserted in a member to provide an electrical indication of a physical variable acting on the member.

More particularly, the invention pertains to a transducer of a type employing an elastic member to which are bonded a plurality of electrical resistance strain gages. As is well known a resistance strain gage is of a conductive material having an electrical resistance that varies with the strain imposed on the gage. Such gages have many applications whereas physical variable such as load, torque, pressure or acceleration, is caused to strain a gage an amount proportional to the variable whereby the variable can be measured, indicated or controlled.

Although the strain gages can be mounted directly on a member that is subjected to the physical variable, this requires a certain amount of skill to properly locate the strain gage so as to measure the principal strains involved and to calibrate the output so that it is proportional to the variable. Consequently, it quite often occurs that the gages are first mounted on elastic members by people, having the prerequisite skill, to form a device known as a transducer. The transducer is then connected into the system containing the physical variable. This action is advantageous because it eliminates the need during final assembly of the system of the presence of personnel skilled in the technique of stress analysis.

The present invention is directed to a transducer designed to be inserted into a load carrying member for providing an indication of the load transmitted through the member.

Accordingly, one of the objects of the invention is to provide a new and improved transducer having a universal action so that both tensile and compressive strains can be measured.

Another object of the invention is to provide a transducer that is insertable into a member to measure a physical variable acting on the member.

Still another object is to provide a transducer that is insertable into an elastic member in such a manner as to fully follow the member for both tensile and compressive strains.

Other objects and advantages of the invention will be apparent from the following description taken in connection with the accompanying drawing wherein.

Figure 1:
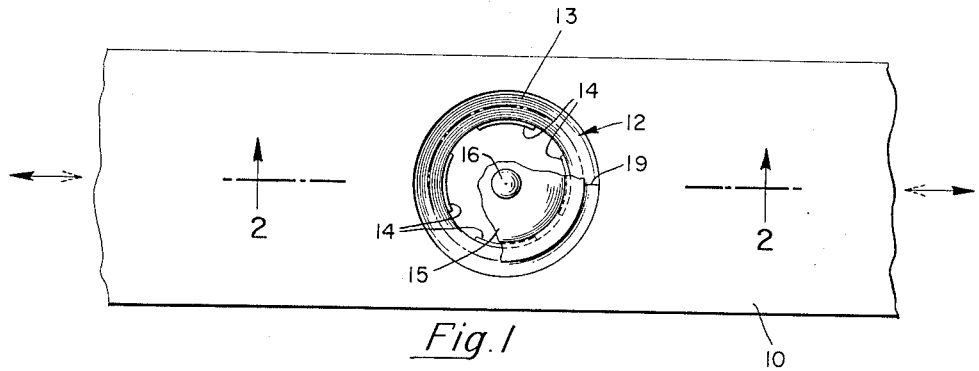
FIG. 1 is a top plan view of an illustrative embodiment of the invention.
Figure 2:
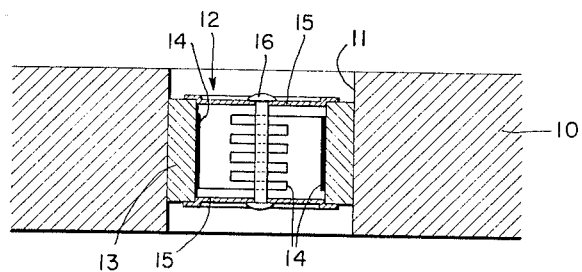
FIG. 2 is a longitudinal vertical sectional view along reference lines 2—2 of FIG. 1.

Referring now to the drawing, there is shown in FIGS. 1 and 2 an elongated member 10 having a circular hole 11 in which is mounted a transducer 12 comprising a circular ring 13 of rectangular cross section having bonded to its inner wall four strain gages 14 arranged to form a conventional strain measuring bridge. The transducer further includes a pair of covers 15 held in place by a rivet 16, and, one of covers 15 is provided with an aperture (not shown) through which a cable (not shown) passes, the cable being conventional and connecting the bridge to conventional strains measuring equipment.

Ring 13 is press fitted into hole 11, the ring and hole being dimensioned to provide an interference fit that will produce a compressive strain in the ring equal to or slightly greater than the maximum strain at the edge of the hole due to the applied load.

Figure 3:
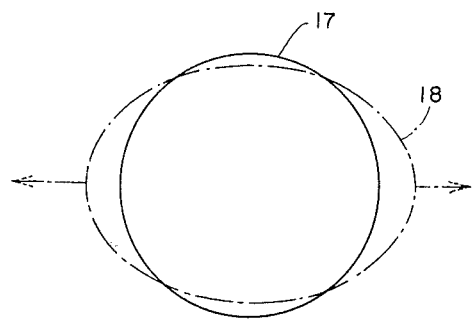
FIG. 3 is a diagram for explaining a portion of the principle of operation of the invention.

The reason for this is as follows: With reference to FIG. 3, the full line 17 represents the edge of the circular hole which, upon application thereto of a diametrically directed tensile force applied in the direction of the arrows, distorts so as to increase in diameter in the direction of force and decrease in diameter transversely of the force, the decrease being less than the increase by an amount which depends on the geometry of the hole and of the member, on Poisson's ratio for the material, and on the rigidity of the material.

Now, if the ring were inserted into the hole without any interference, those edges of the ring spaced diametrically and in the direction of the tensile forces would separate from the walls and would thus be ineffective to accurately indicate the strain. By providing the above-described interference fit, the ring 13, because of its stressed condition, follows those edges of hole 11 spaced diametrically in the direction of applied tensile forces so that there is no separation between them.

This problem of separation between the transducer and test object 10 is not as severe when the object is transmitting a compressive force since, under such circumstances, the transverse points of the ring are forced into following the expanding transverse edges of the hole. Another advantage of providing the interference fit is that where object 10 is subjected to a lot of motion and vibration the transducer will remain in place and will retain its original calibration. Ring 13 is provided with an indicia or mark 19 that allows the ring to be inserted whereby the strain gages, which are hidden from view, are aligned to measure principal strains.

While only a single embodiment has been illustrated, it will be apparent to those skilled in the art that changes can be made without departing from the scope of the invention as defined in the appended claims.

What is claimed is:

1. The combination of: load-carrying member having a circular hole therein, and a transducer for measuring the magnitude of said load, said transducer comprising a ring interference fitted in said hole so as to produce a circumferential strain in said ring equal to the maximum strain in the abutting walls of the hole due to the applied load.

2. A transducer adapted to be press-fitted into a hole in a member for measuring tensile and compressive loads transmitted through said member, comprising: a ring dimensioned for an interference fit in the hole so as to produce in the ring, upon insertion into the hole, a circumferential stress at least equal to the expected maximum stress in the perimetric portions of the hole due to the applied load; and electric resistance type strain gage means bonded to said ring for measuring the strain therein.

3. The combination of: an elastic member subject to tensile and compressive strains and having an aperture therein; and a transducer inserted into said aperture, said transducer comprising an elastic member having an interference fit with the walls of said aperture so as to follow them under the applied strains, said transducer further comprising strain gage means responsive to strains induced in said elastic member.

References Cited in the file of this patent

UNITED STATES PATENTS 3,100,290    Propper _____ Aug. 6, 1963